US006969809B2

(12) United States Patent
Rainey

(10) Patent No.: US 6,969,809 B2
(45) Date of Patent: Nov. 29, 2005

(54) VEHICLE SEAT WEIGHT SENSOR

(75) Inventor: Robert R. Rainey, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 208 days.

(21) Appl. No.: 10/667,760

(22) Filed: Sep. 22, 2003

(65) Prior Publication Data
US 2005/0061643 A1 Mar. 24, 2005

(51) Int. Cl.⁷ .......................... G01G 19/00; G01L 1/00; H01C 10/10
(52) U.S. Cl. ............. 177/136; 73/862.625; 73/862.627; 177/144; 338/47
(58) Field of Search ..................... 73/862.625–862.635, 73/862.473, 862.474; 177/211, 213, 225, 229, 256, 188, 168, 170, 144, 154, 25.13, 136, 199, 200; 340/665–668; 338/4, 5, 47; 200/85 R, 85 A

(56) References Cited

U.S. PATENT DOCUMENTS

| | | |
|---|---|---|
| 2,090,188 A | 8/1937 | Dahlstrom |
| 2,439,146 A | 4/1948 | Ruge |
| 2,995,034 A | 8/1961 | Boiten |
| 3,084,542 A | 4/1963 | Stathan |
| 3,367,178 A | 2/1968 | Tell et al. |
| 3,481,626 A | 12/1969 | Fergle |
| 3,559,467 A | 2/1971 | Gurol et al. |
| 3,780,817 A | 12/1973 | Videon |
| 3,915,248 A | 10/1975 | Paelian |
| 3,993,151 A | 11/1976 | Wirth |
| 4,396,079 A | 8/1983 | Brendel |
| 4,453,609 A | 6/1984 | Griffen et al. |
| 4,556,598 A | 12/1985 | Bloom et al. |
| 4,739,848 A | 4/1988 | Tulloch |
| 4,785,673 A | 11/1988 | Aumard |
| 5,060,174 A | 10/1991 | Gross |
| 5,109,199 A | 4/1992 | Berger |
| 5,211,061 A | 5/1993 | Goodwin |
| 5,222,398 A | 6/1993 | O'Brien |
| 5,232,243 A | 8/1993 | Blackburn et al. |
| 5,276,432 A | 1/1994 | Travis |
| 5,327,791 A | 7/1994 | Walker |
| 5,507,182 A | 4/1996 | Yamada et al. |
| 5,512,713 A | 4/1996 | Naito et al. |
| 5,531,472 A | 7/1996 | Semchena et al. |
| 5,539,158 A | 7/1996 | Utsunomiya et al. |
| 5,573,269 A | 11/1996 | Gentry et al. |

(Continued)

FOREIGN PATENT DOCUMENTS

| | | |
|---|---|---|
| DE | 195 47 472 A1 | 6/1997 |
| EP | 0548927 A7 | 6/1993 |
| GB | 1 109 176 A | 4/1968 |
| GB | 1 111 134 A | 4/1968 |
| GB | 2 234 629 A | 2/1991 |
| GB | 2 233 070 A | 7/1999 |
| GB | 2 343 953 A | 5/2000 |
| JP | 3214217 A2 | 9/1991 |

Primary Examiner—James R. Scott
(74) Attorney, Agent, or Firm—Mark P. Bourgeois

(57) ABSTRACT

A seat weight sensor for detecting the weight of a seat occupant. The weight sensor has a case mounted between a seat pan and a seat member. One or more strain gauge resistors are mounted in the case. The resistors generate an electrical signal in response to the case being stressed by the weight of the seat occupant. The electrical signal changes as a function of the weight of the occupant. A fastener passes through the seat member, the case, and the seat pan. The fastener secures the sensor between the seat pan and the seat member. The case is adapted to transfer to the strain gage resistor the weight of the occupant up to pre-determined level. The case prevents the strain gage from receiving weight beyond that of the pre-determined level such that the sensor is not damaged by an excessive load. The case also allows the weight sensor to be insensitive to off-axis forces that might otherwise contribute to inaccurate weight readings.

47 Claims, 9 Drawing Sheets

U.S. PATENT DOCUMENTS

| | | |
|---|---|---|
| 5,574,221 A | 11/1996 | Park et al. |
| 5,629,488 A | 5/1997 | Kropp |
| 5,708,207 A | 1/1998 | Nagahara et al. |
| 5,732,375 A | 3/1998 | Cashler |
| 5,739,757 A | 4/1998 | Gioutsos |
| 5,756,943 A | 5/1998 | Naito et al. |
| 5,801,339 A | 9/1998 | Boult |
| 5,810,392 A | 9/1998 | Gagnon |
| 5,821,633 A | 10/1998 | Burke et al. |
| 5,865,463 A | 2/1999 | Gagnon et al. |
| 5,906,393 A | 5/1999 | Mazur et al. |
| 5,942,695 A | 8/1999 | Verma et al. |
| 5,959,214 A | 9/1999 | Vaidyanthan et al. |
| 5,971,432 A | 10/1999 | Gagnon et al. |
| 5,986,221 A | 11/1999 | Stanley |
| 5,991,676 A | 11/1999 | Podoloff et al. |
| 5,997,033 A | 12/1999 | Gray et al. |
| 6,039,344 A | 3/2000 | Mehney et al. |
| 6,054,761 A | 4/2000 | McCormack et al. |
| 6,069,325 A | 5/2000 | Aoki |
| 6,070,115 A | 5/2000 | Oestreicher et al. |
| 6,073,987 A | 6/2000 | Lindberg et al. |
| 6,089,106 A | 7/2000 | Patel et al. |
| 6,092,838 A | 7/2000 | Walker |
| 6,109,117 A | 8/2000 | Stanley et al. |
| 6,161,891 A | 12/2000 | Blakesley |
| 6,225,576 B1 | 5/2001 | Poole et al. |
| 6,231,076 B1 | 5/2001 | Blakesley et al. |
| 6,244,116 B1 | 6/2001 | Osmer et al. |
| 6,250,671 B1 | 6/2001 | Osmer et al. |
| 6,401,855 B1 * | 6/2002 | Wolfe ..................... 177/136 X |
| 6,407,347 B1 | 6/2002 | Blakesley |
| 6,407,350 B1 | 6/2002 | Blakesley |
| 6,417,466 B2 | 7/2002 | Gross et al. |
| 6,433,289 B1 | 8/2002 | Gurr |
| 6,583,367 B2 * | 6/2003 | Wolfe et al. ................. 177/136 |

* cited by examiner

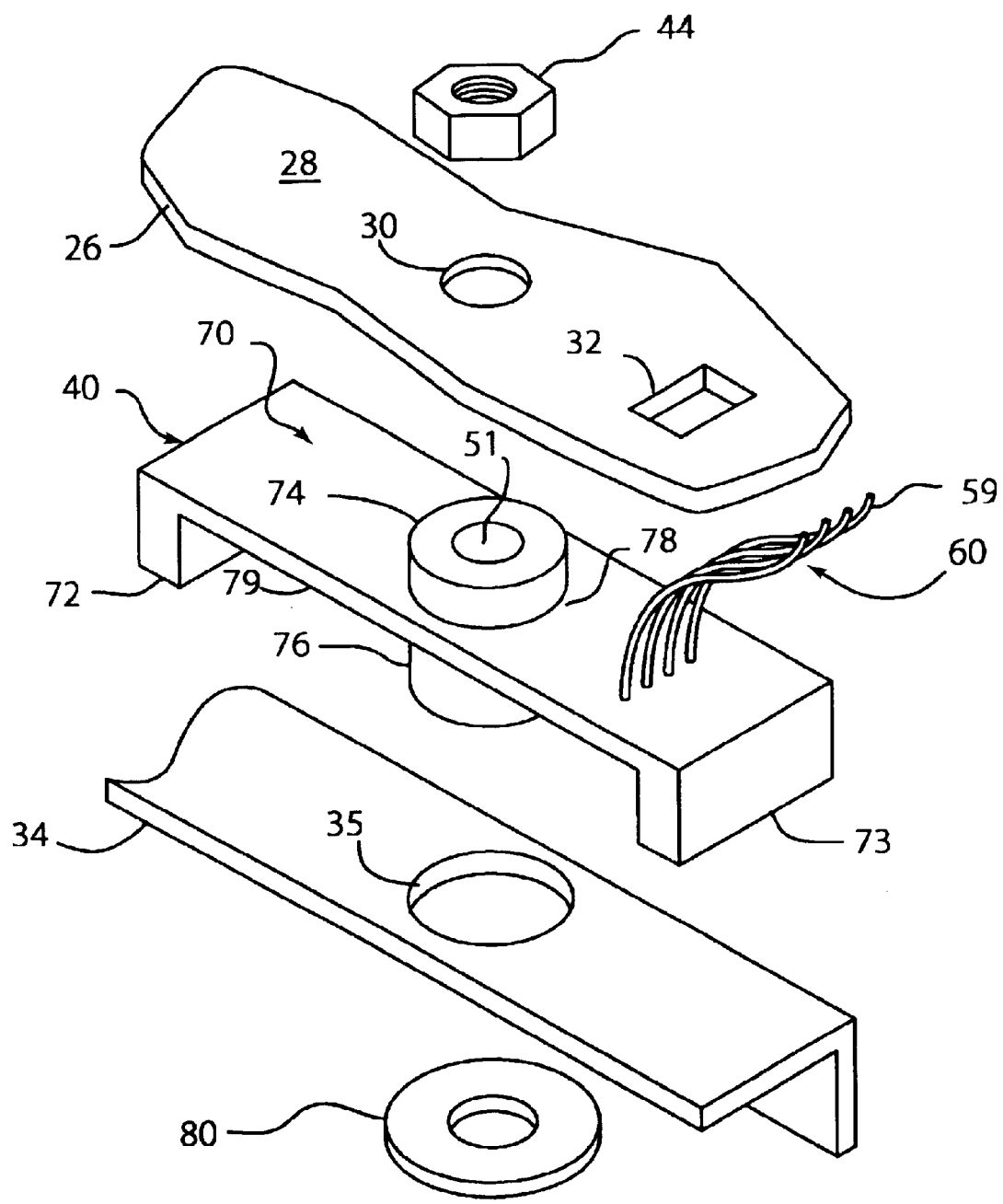
FIG. 2
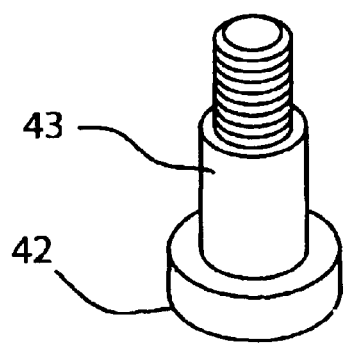

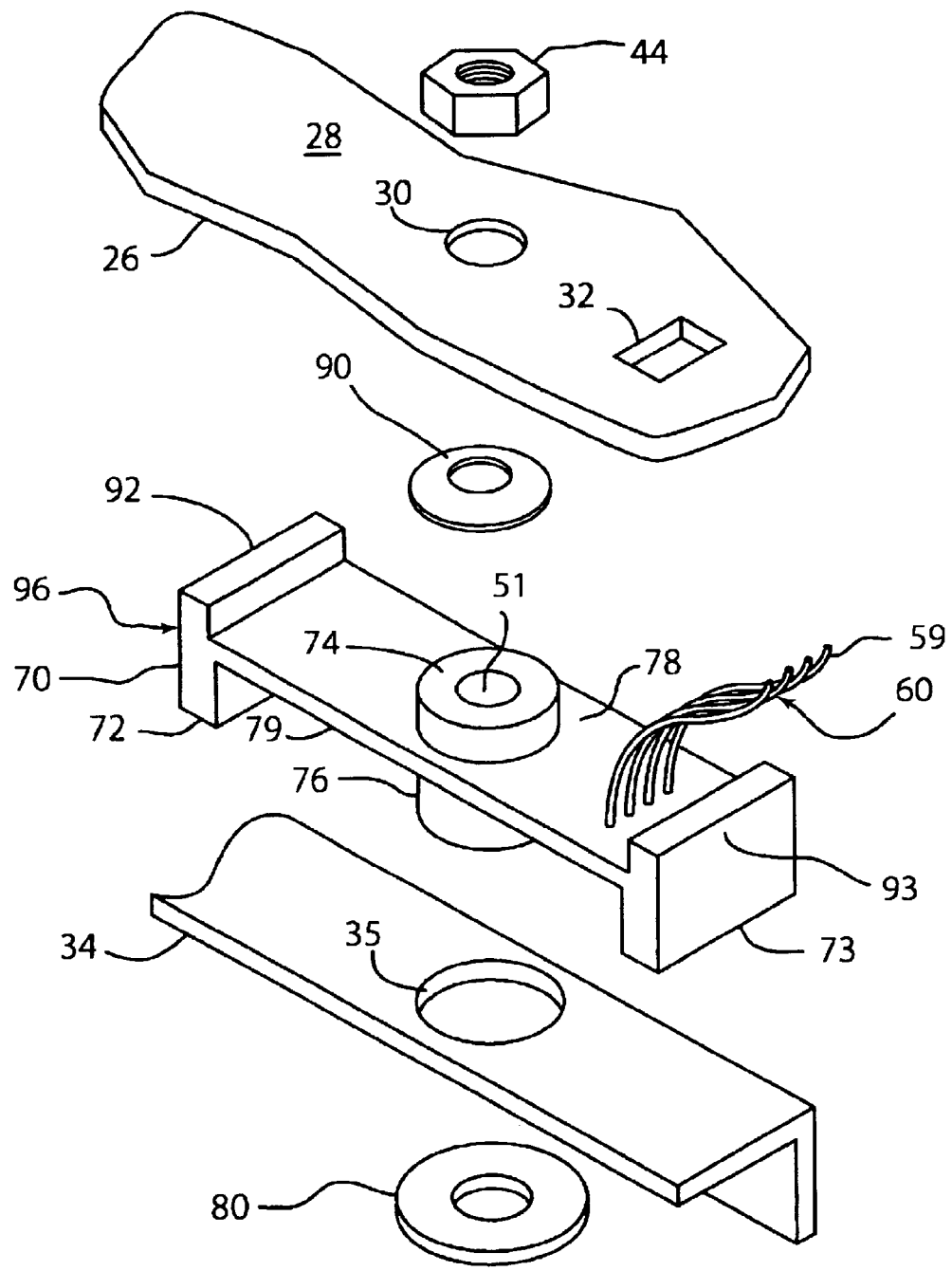
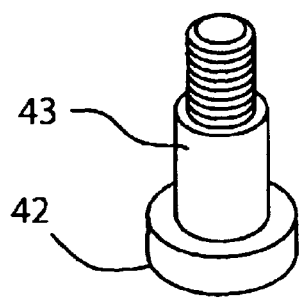

VEHICLE SEAT WEIGHT SENSOR

BACKGROUND OF THE INVENTION

1. Field of the Invention

This invention relates to an automobile weight sensor for detecting the presence of a person in a car seat, and in particular to a sensor that can detect the presence of an occupant using strain sensitive resistors and provide an electrical signal to control activation of an airbag.

2. Description of the Related Art

Automobiles are equipped with restraint systems, such as seat belts, and inflatable restraint systems, such as airbags, to improve passenger safety. In some situations, these safety devices can injure the occupants. For example, an occupant in the front passenger seat may be injured by deployment of an airbag, if the occupant is a baby or child. It is desirable to control the operation of the airbag according to the weight of a passenger for improved performance of seat belts and airbags. A device for measuring the weight of a passenger sitting on a vehicle seat is needed to prevent or modify the deployment of the airbag when the weight is less than a predetermined amount.

There have been a number of attempts to measure the weight of a seat occupant, all with significant disadvantages. For example load cells or strain gages have been used in a vehicle seat. One problem encountered in measuring the weight of a seat occupant is that the weight reading needs to be uniform when the vehicle is moving. When the vehicle travels around a curve or in a turn, the weight sensor cannot have a large change in its reading. In other words, the weight sensor needs to be somewhat insensitive to loads that are not in the vertical direction. The load cells of the prior art have suffered from giving false readings when subjected to side loads.

The seat weight sensor also needs to be manufactured at a low cost and must be able to withstand large loads. The sensor cannot be damaged by crash forces or other overloads. Prior art seat weight sensors have suffered from requiring an extensive redesign of the seat frame in order to be installed. It is desirable for a seat weight sensor to be installed in existing car seats with a minimum of changes to the existing seat design.

A current unmet need exists for a reliable, low cost, robust automobile seat weight sensor that is insensitive to off axis loads and that can be installed in a vehicle with a minimum of changes to the existing seat design.

SUMMARY

It is a feature of the invention to provide a reliable and cost-effective vehicle seat weight sensor for detecting the weight of a seat occupant. The sensor uses strain sensitive resistors.

An additional feature of the invention is to provide a weight sensor for sensing the weight of an occupant in a vehicle seat. The seat has a seat pan and a seat member. The weight sensor includes a case mounted between the seat pan and the seat member. One or more strain gauge resistors are mounted in the case. The resistors generate an electrical signal in response to the case being stressed by the weight of the seat occupant. The electrical signal changes as a function of the weight of the occupant. A fastener passes through the seat member, the case, and the seat pan. The fastener secures the sensor between the seat pan and the seat member. The case is adapted to transfer to the strain gage resistor the weight of the occupant up to a first magnitude. The case prevents the strain gage from receiving weight beyond that of the first magnitude.

BRIEF DESCRIPTION OF THE DRAWINGS

FIG. 2 is an exploded perspective view of the vehicle seat weight sensor.

FIG. 6 is an exploded perspective view of an alternative embodiment of a vehicle seat weight sensor.

It is noted that the drawings of the invention are not to scale. In the drawings like numbering represents like elements between the drawings.

DETAILED DESCRIPTION

Figure 1:
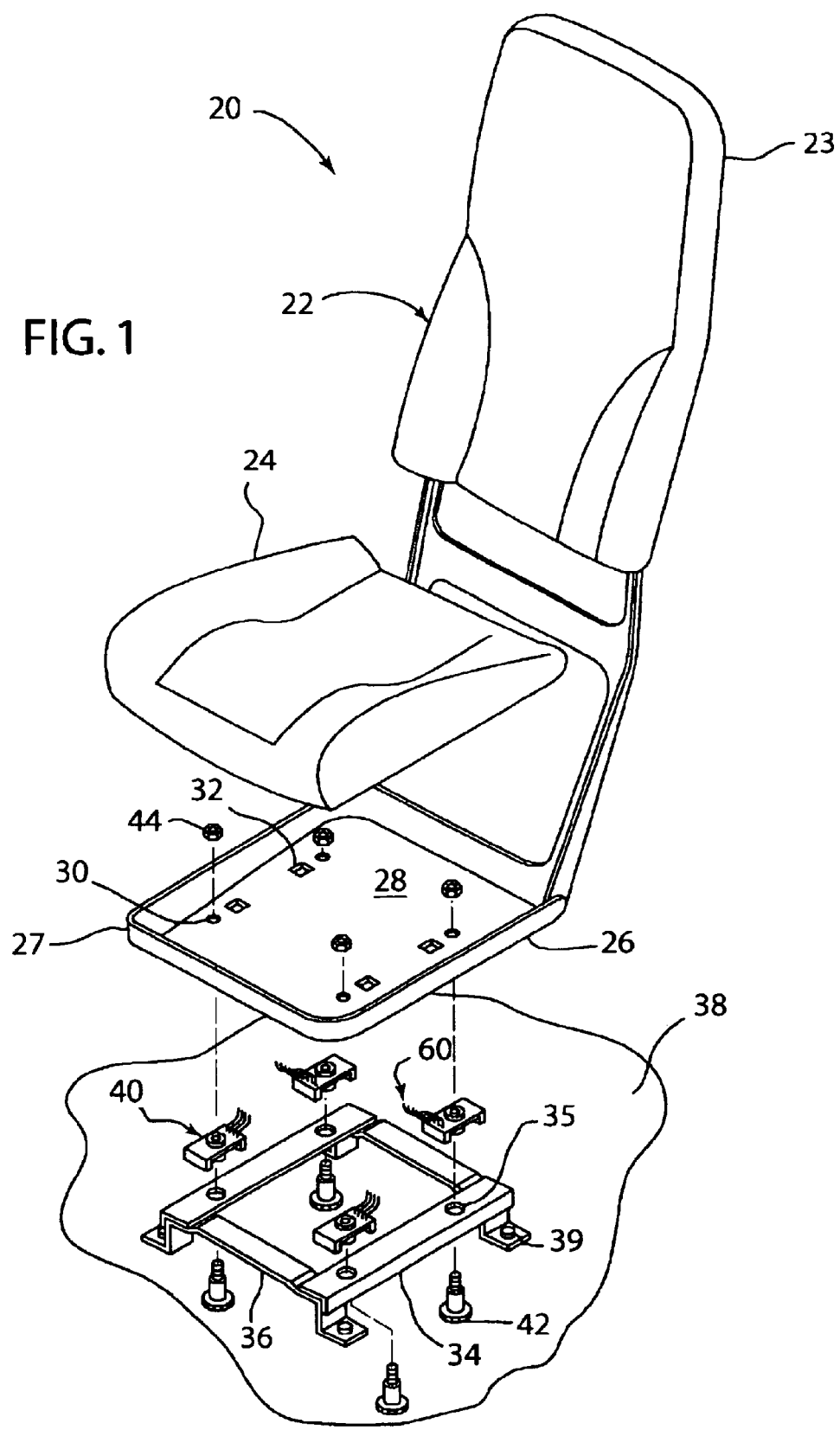
FIG. 1 is a perspective view of a vehicle seat weight sensor mounted in an automobile seat.

The present invention provides a vehicle weight sensor for detecting the weight of a seat occupant. Referring to FIG. 1, there is a seat assembly 20 shown. Seat assembly 20 has a seat 22 with a seat back 23, and a seat bottom 24. A metal first seat member or pan 26 is located between a second seat member or rail 34 and seat bottom 24. Seat member 34 can be a slide rail. Seat pan 26 has a seat pan bottom 28 that has four bolt holes 30 formed therein. Seat pan bottom 28 also has four wire holes 32. A seat pan outer rim 27 runs around the outside perimeter of seat pan 26. Member 34 is slidably attached to a carriage 36 by roller bearings (not shown). Member 34 has holes 35. The seat member or slide rail allows seat assembly 20 to slide forward and backwards in a vehicle. The carriage 36 is attached to a vehicle floor 38 by a fastener 39 such as a bolt or rivet.

Four weight sensor assemblies 40 are shown mounted at the four corners of seat assembly 20 between seat pan 26 and rail 34. A fastener 42 such as a bolt, rivet or screw passes through rail 34, sensor 40 and pan 26. A nut 44 attaches to fastener 42 above seat pan bottom 28.

Referring to FIGS. 2–5, details of the weight sensor assembly 40 are shown. Sensor 40 has a metal substrate 46 with two ends, a first end 47 and a second end 48. Substrate 46 has a top surface 49, a bottom surface 50 and an aperture 51. Substrate 46 is preferably formed from 430 stainless steel. An insulative dielectric layer 52 is shown disposed on top surface 49. Four strain gauge resistors 54A, 54B, 54C and 54D are arranged on top of dielectric layer 52 around aperture 51.

Resistors 54A–D are strain sensitive and will change resistance based on the amount of strain in substrate 46. Circuit lines 56 connect resistors 54A–D to terminals 58. The terminals are used to solder to individual wires 59 in a wiring harness 60. A cover coat (not shown) would be placed over resistors 54A–D and circuit lines 56. The cover coat protects the resistors from damage and acts as a solder mask.

Dielectric layer 52, Resistors 54A–D and terminals 58 can be formed from conventional thick film materials using conventional thick film screening and processing techniques that are commercially available. Dielectric layer 52, Resistors 54A–D and terminals 58 can also be formed from a ceramic green tape. Such methods of forming resistors on metal substrates are detailed in U.S. Pat. No. 4,556,598 titled, "A porcelain tape for producing porcelainized metal substrates", the contents of which are specifically herein incorporated by reference. In a typical configuration, Resistors 54A–D would be connected to form a wheatstone bridge circuit that is well known in the art.

Metal substrate 46 is overmolded with a slightly elastomeric plastic cover or case 70. Case 70 surrounds substrate 46. Wire harness 60 is attached to terminals 58 and then overmolded with case 70. The overmolded case acts as a strain relief for the wire harness. Case 70 is preferably formed from a thermoplastic material that is slightly compliant or elastomeric. Case 70 has a pair of downwardly extending blades 72 and 73. An upper boss 74 extends from upper surface 49. A lower boss 76 extends from lower surface 50. Aperture 51 passes through the bosses and substrate 46. Case 70 has a top center portion 78 and a bottom center portion 79. Over-molding the substrate provides environmental protection for the substrate. The over-molding operation reduces the cost of the sensor. The over-molding could also be implemented as discrete pieces that are adhesively attached to the substrate.

Fastener 42 is used to attach sensor 40 between seat pan 26 and seat member 34. Fastener 42 can be a bolt and nut 44 or a bolt and a threaded hole or can be a rivet. An elastomeric washer 80 is located between seat member 34 and fastener 42. Washer 80 reduces noise and serves as a compliant member. Fastener 42 passes through hole 35, washer 80, aperture 51 and hole 30. Nut 44 is located above seat pan bottom 24 and threadedly mates with fastener 42. Fastener 42 has a non-threaded shoulder 43. Wire harness 60 passes through wire hole 32 and runs along seat pan bottom 24. The four wiring harnesses can be connected together at a junction box (not shown) in the center of the seat, if desired.

Case 70 is able to move slightly from side to side in hole 35, this allows side loads on assembly 20 that are not in the vertical axis to be absorbed by case 70 but not measured. In other words, case 70 decouples the strain gage resistors from side or off vertical axis loads. Sensor 40 therefore is somewhat insensitive to side loads which are undesirable to be measured. Loads in the vertical direction are representative of seat occupant weight and are measured by sensor 40.

Figure 3:
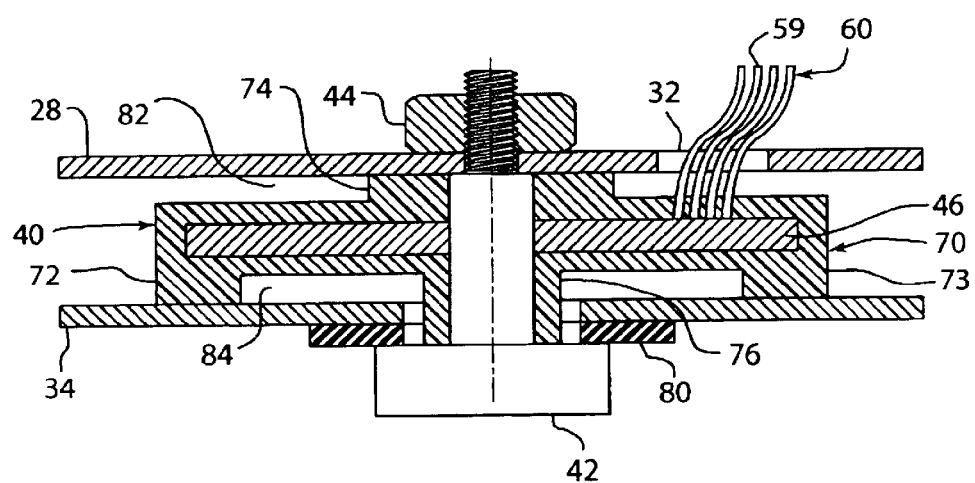
FIG. 3 is an assembled cross-sectional side view of a FIG. 2.
Figure 4:
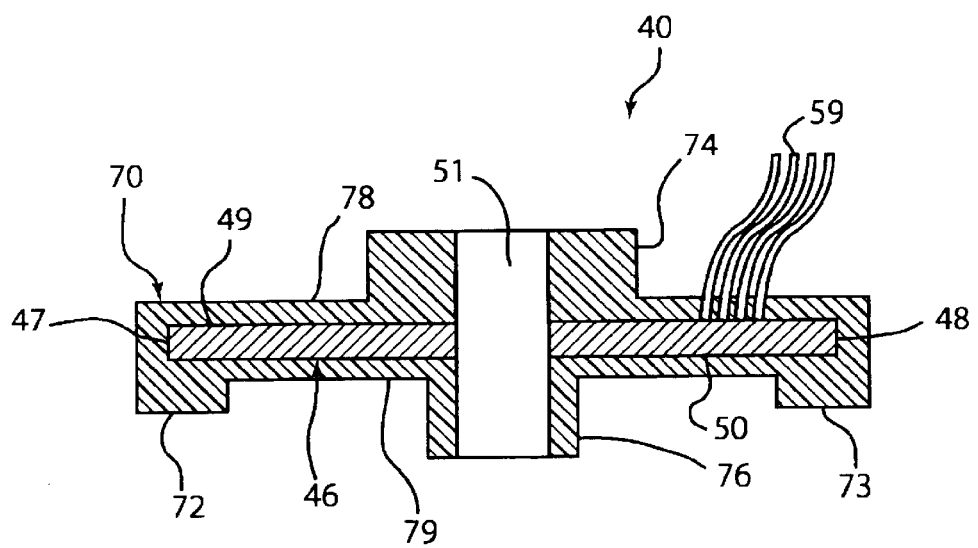
FIG. 4 is an enlarged cross-sectional view of the weight sensor of FIG. 2.
Figure 5:
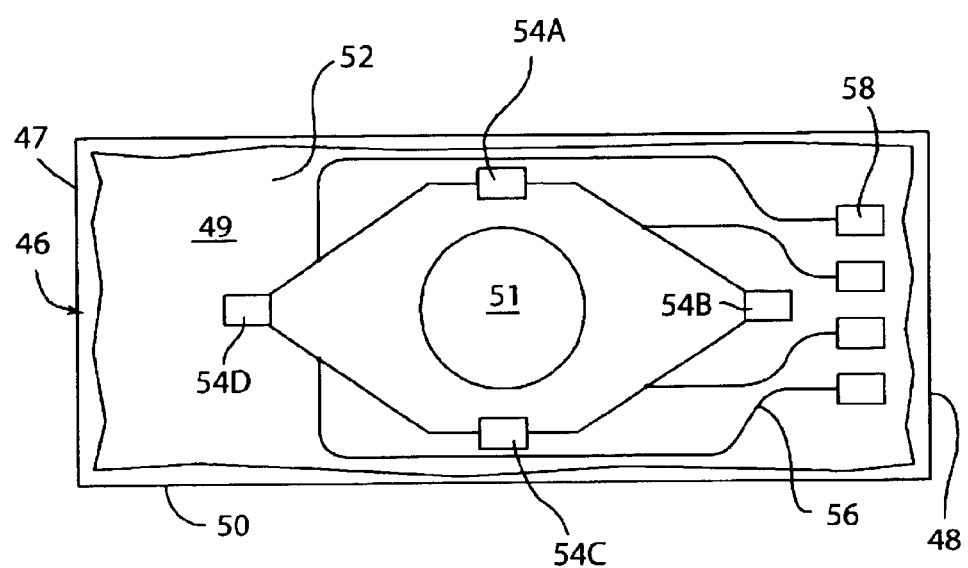
FIG. 5 is a top view of the sensor strain gage.

Referring to FIG. 3, lower boss 76 fits into hole 35. Upper boss 74 and lower boss 76 both surround shoulder 43. A gap 82 is formed between seat pan bottom 28 and top center portion 78. Similarly, another gap 84 is formed between rail 34 and bottom center portion 79. When an occupant sits on seat bottom 24, the seat occupants weight is transferred from seat bottom 24 to seat pan 26, through sensor 40, to seat member 34, then to carriage 36 and floor 38. The entire weight of the seat occupant is supported by the four sensors 40. This weight causes strain in the sensor and is measured by strain gage resistors 54A–D. A voltage is applied to the resistors through wires 59. An electrical output signal is generated that is proportional to the seat occupant's weight. The electrical signal is transmitted over one of the wires to a conventional air bag controller (not shown). The air bag controller then can control deployment of the airbag based upon the seat occupant's weight. Typically, the air bag is disengaged or turned off below a minimum weight, such as for a child.

The length of shoulder 43 is slightly less than the distance between the lower end of boss 74 and the upper end of boss 76. The elastomeric bosses are compressed slightly upon the application of weight. This is not a requirement for the function of the weight sensor; however, it helps to reduce noise. Boss 76 is free to move vertically in hole 35. The bosses 74 and 76 and bolt 42 can move a small amount in the vertical direction. The blades 72 and 73 are in contact with seat member 34 and have a minimum amount of travel in the vertical direction. Boss 76 and hole 35 resist horizontal motion while allowing for some compliance such that a large weight reading by the sensor is not generated for a small misalignment of the seat pan and seat member.

When weight is applied to seat pan 26, it is transferred to boss 74. The load is then carried through central portions 78, 79 and substrate 46 to blades 72 and 73, which transfer the load to seat member 34. The bosses and blades and elastomeric washer 80 work together to allow the weight sensor to isolate substrate 46 from torque loads and off-axis loads that are not applied in the vertical direction. In addition, the symmetrical strain resistor placement is inherently insensitive to applied torque loads. These features together allow the device to function, even though, in practice, the seat pan and seat member will not be parallel.

Weight sensor 40 has many advantages. Weight sensor 40 provides overload protection for the strain sensitive resistors. If an excessive force is applied to substrate 46, it could be permanently deformed, if it is stressed beyond its elastic region. This would result in a permanent voltage shift for the strain sensitive resistors. Overload protection for down loads or positive loads is achieved when the lower gap 84 is closed and central portion 79 contacts seat member 34. Any additional loading then passes directly to seat member 34 without passing through substrate 46. Overload protection for upward loads or negative loads is achieved by the non-linear spring rate of elastomeric washer 80.

Additional negative overload protection can be added by the addition of a spring around washer 80. As an example a Belleville washer (not shown) could be added adjacent washer 80 surrounding fastener 42. A negative load would compress a Belleville washer, applying a pre-load, until it reaches its solid height. At this point, any additional applied load would bypass weight sensor 40.

Elastomeric washer 80 is provided to prevent metal to metal contact when the net loading tends to separate seat pan 26 and seat member 34. It also can serve as a compliant member, which fills the gap while allowing for dimensional variation and it may also provide a pre-load on the assembly. A spring (not shown) may work in concert with or replace Washer 80 if more consistent pre-load values are desired or if the changes in the elastomer's properties with temperature affect measurement performance. Adding a defined or calibrated pre-load would allow for the measurement of negative (separation) loads.

A particular feature of sensor 40 is that strain sensitive resistors 54A–D can be placed in either compression or tension but not both. The design of sensor 40 provides a mechanical structure that only allows either compression or tension forces to be transferred to strain gages 54A–D but not both. This is a major advantage because when a strain sensitive resistor is cycled from compression to tension or from tension to compression, it causes hysteresis in the strain sensitive resistors. Previous sensors have had a bi-directional operation which causes more hysteresis.

1$^{st}$ Alternative Embodiment

Figure 7:
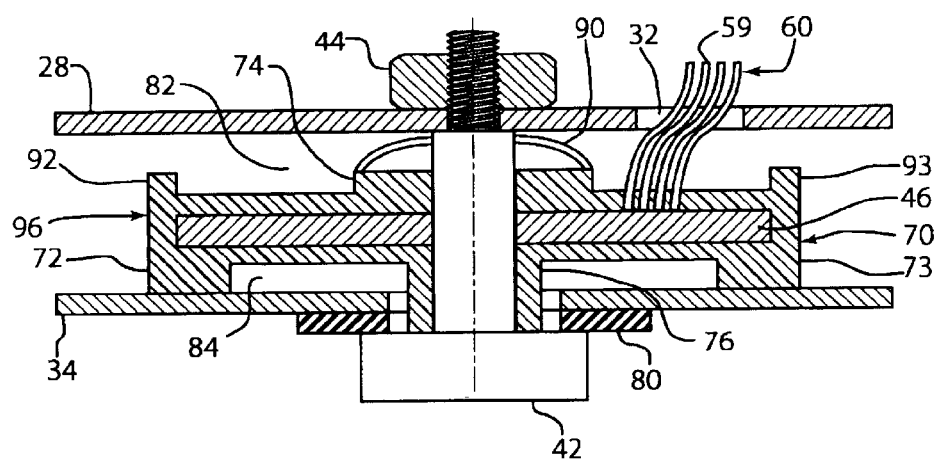
FIG. 7 is an assembled cross-sectional side view of a FIG. 6.
Figure 8:
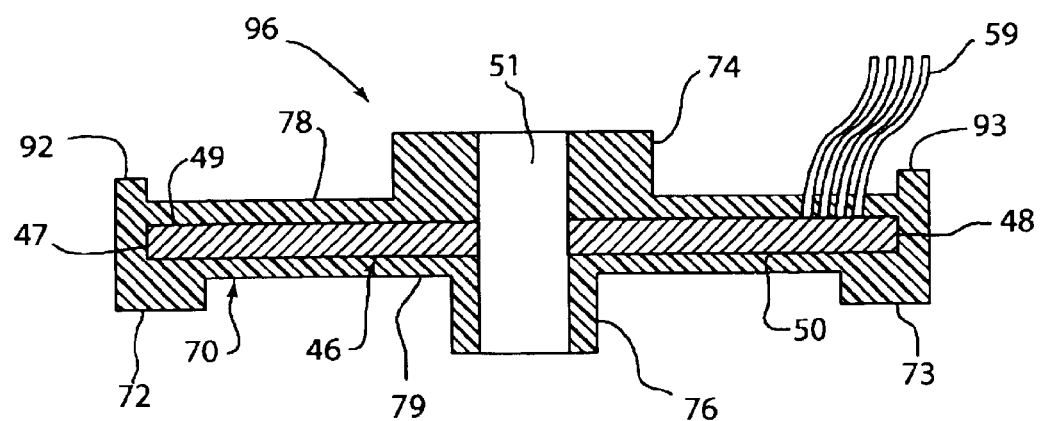
FIG. 8 is an enlarged cross-sectional view of the weight sensor of FIG. 6.

Referring to FIGS. 6–8, details of an alternative weight sensor assembly 96 are shown. Sensor 96 is similar to sensor 40 except that a spring washer 90 and standoffs 92, 93 have been added.

Spring washer 90 is located between boss 74 and seat pan 26. Other types of springs could also be used for washer 90 such as coil springs or leaf springs. The spring 90 allows for more motion of sensor 96 and allows for more deflection of substrate 46 when weight is applied. Shoulder 43 passes through the hole in washer 90.

Standoffs 92 and 93 extend upwardly from upper surface 78 at the ends of case 70. Standoffs 92 and 93 are opposed from blades 72 and 73. The standoffs 92 and 93 are molded from plastic in the same manner as blades 72 and 73.

The operation of weight sensor 96 is as follows:

The fastener 42 is free to slide up and down in aperture 51. Spring 90 is pre-compressed to a pre-determined load designated as (L). This load is carried in tension by fastener 42 and in compression by case 70 of sensor 96.

When an occupant sits on seat bottom 24, the seat occupants weight is transferred from seat bottom 24 to seat pan 26 through spring 90, through upper boss 74, through substrate 46, through blades 72 and 73 to seat member 34, then to carriage 36 and floor 38. The entire weight of the seat occupant is supported by the four sensors 96. This weight causes strain in the sensor and is measured by strain gage resistors 54A–D. A voltage is applied to the resistors through wires 59. An electrical output signal is generated that is proportional to the seat occupant's weight. The electrical signal is transmitted over one of the wires to a conventional air bag controller (not shown). The air bag controller then can control deployment of the airbag based upon the seat occupant's weight. Typically, the air bag is disengaged or turned off below a minimum weight such as for a child.

From zero load up to load L, the seat pan 26 moves downward according to the spring rate of sensor 96. Case 72 and substrate 46 together flex and act as a spring with a limited range of motion. This is the spring rate associated with sensor 96. When the pre-compression load L is reached, fastener 42 is no longer in tension. At loads slightly greater than load L, the seat pan 28 moves downward according the series combination of the spring rates of sensor 96 and spring 90. Spring 90 is chosen to have a spring rate much lower than that of sensor 96 so that seat pan 28 moves relatively much farther for load increments slightly above load L than it does for loads below load L. The gap 82 between standoffs 92 and 93 and pan 28 is sized such that this gap is closed at a maximum load (M) before spring 90 is fully compressed. Substantially all additional load applied above the maximum load M is transferred from pan 28 to standoffs 92 and 93 and then through blades 72 and 73 to seat member 34. The maximum load M is chosen to be sufficiently below the maximum design load of substrate 46 such that substrate 46 is protected from loads above its design limit. Sensor 96 therefore provides overload protection for the strain sensitive resistors. The load bearing standoffs 92 and 93 are representative of alternate load paths in general and could be designed differently. The overload protection is not dependent upon the shape of the substrate 46.

The overload path structures need not be a part of the sensor if the tolerances of the external structure are taken into consideration in the design of the sensor. For example, a load bearing member may be placed an appropriate distance below the head of bolt 42 or directly below seat pan 26. Generally, these structures would be part of or somehow tied to seat member 34 in order to move in concert with seat member 34.

It is noted that there may be some advantage to inverting spring 90 from the position shown in FIG. 7. This would allow the load transferred to sensor 96 to be transferred closer to the center of sensor 96. This would tend to increase the load levels near the center portions 78 and 79 and thus increase the maximum stress levels near the center of substrate 46.

Washer 80 is designed to provide one or more of the following functions: load spreading, impact damping, noise reduction and gap filling. Washer 80 could also be a spring, similar to spring 90. Washer 80 could also be an assembly including multiple components such as a washer and a spring. Washer 80 can perform one or more of the functions listed above. In addition, washer 80 could apply a load that is some fraction of the pre-compression load L called N. This load would appear as a constant offset in the weight reading of sensor 96. Applying this type of load allows weight measurements in the reverse or negative (vertical) direction. The reverse direction is when the seat pan is pulled upwards. A washer 80, pre-compressed to load N, would allow weight measurements up to a maximum weight of N in the reverse direction and in the normal load direction up to the maximum load M minus the pre-compression load N.

In the reverse direction, there is no problem with a sensor overload since the sensor 96 is not directly attached to seat member 34. The pre-compression load N can be applied with equal efficacy either at the position of washer 80 or between nut 44 and seat pan 26.

Similar to sensor 40, the bosses and blades and elastomeric washer 80 work together to allow the weight sensor 96 to isolate substrate 46 from torque loads and off-axis loads that are not applied in the vertical direction. In addition, the symmetrical strain resistor placement is inherently insensitive to applied torque loads. These features together allow the device to function even though, in practice, the seat pan and seat member will not be parallel.

2nd Alternative Embodiment

Figure 9:
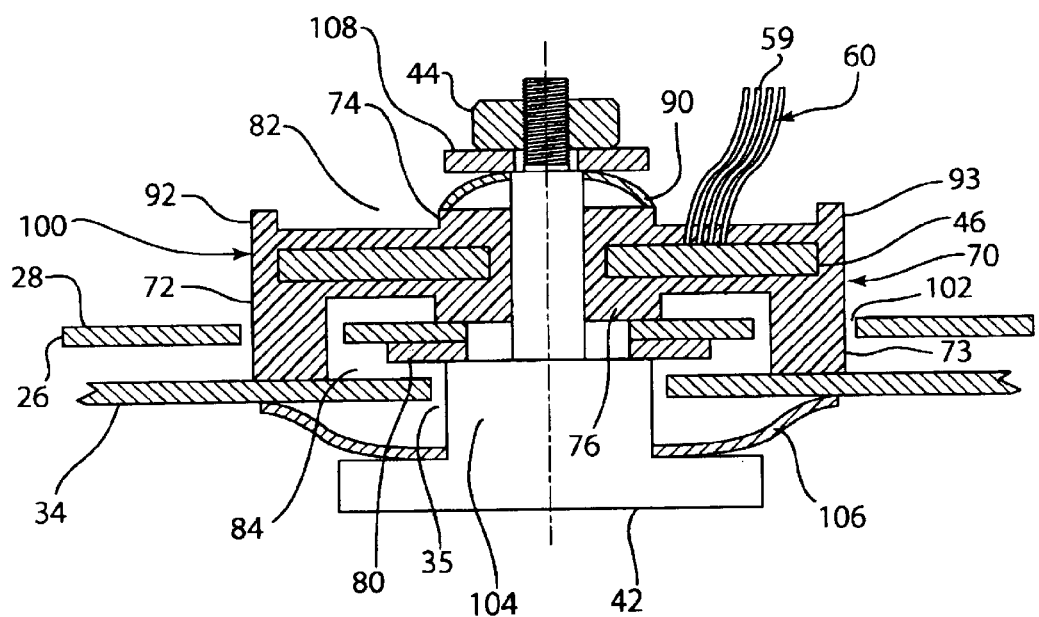
FIG. 9 is a cross-sectional view of an alternative embodiment of a vehicle seat weight sensor in accordance with the present invention.

Referring to FIG. 9, details of an alternative weight sensor assembly 100 are shown. The location of sensor 100 is different than in previous embodiments. Sensor 100 is located above seat pan 26. In some seat configurations, it may be desirable to have the sensor located above the seat pan in order to reduce the overall height of the seat assembly. Seat pan 26 has openings 102 through which blades 72 and 73 extend to contact seat member 34. Fastener 42 has a boss 104 that fits into hole 35.

First spring washer 90 is retained between plate 108 and upper boss 74. Spring washer 90 is compressed during assembly by nut 44 pushing plate 108 downwardly. Spring washer 90 is compressed to a load L1 of approximately 100 kilograms of spring force. Elastomeric washer 80 is compressed between boss 104 and seat pan 26. A second spring washer 106 is located between fastener 42 and seat member 34. Spring washer 106 is compressed during assembly by nut 44 pulling on fastener 42. Spring washer 106 is compressed to a load L2 of approximately 15 kilograms of spring force. The spring washer 106 allows for more motion of sensor 96 and allows for more deflection of substrate 46 when weight is applied. Shoulder 43 passes through the hole in washer 90.

The operation of weight sensor 100 is as follows:

The fastener 42 is free to slide up and down in aperture 51. Spring 90 is pre-compressed to a load L1. Spring 106 is pre-compressed to a load L2. When an occupant sits on seat bottom 24, the seat occupants weight is transferred from seat bottom 24 to seat pan 26 through fastener 42 to plate 108, through spring 90, through upper boss 74, through substrate 46, through blades 72 and 73 to seat member 34. This weight causes strain in the sensor and is measured by strain gage resistors 54A–D. A voltage is applied to the resistors through wires 59. An electrical output signal is generated that is proportional to the seat occupant's weight. The electrical signal is transmitted over one of the wires to a conventional air bag controller (not shown). The air bag controller then can control deployment of the airbag based upon the seat occupant's weight. Typically, the air bag is disengaged or turned off below a minimum weight such as for a child.

From zero load up to load L1 minus L2, the seat pan 26 moves downward according to the spring rate of sensor 100. Case 72 and substrate 46 together flex and act as a spring with a limited range of motion. This is the spring rate associated with sensor 100. When the load reaches L1 minus L2, boss 76 separates from seat pan 26. For loads above L1 minus L2, the seat weight is still carried through sensor 100. Spring 90 starts to be compressed allowing seat member 26 to move toward seat member 34 until at a load L3 washer 80 contacts seat member 34. Further loads beyond load L3 are transferred from seat member 26 through washer 80 directly to seat member 34. This is the overload position. The maximum load seen by sensor 100 is approximately load L3.

Spring 90 is chosen to have a spring rate much lower than that of sensor 100 so that seat pan 26 moves relatively much farther for load increments slightly above load L1 minus L2 than it does for loads below load L1 minus L2. The gap 84 is sized such that this gap is closed at a maximum load L3 before spring 90 is fully compressed. Substantially all additional load applied above the maximum load L3 is transferred from pan 26 through washer 80 to seat member 34. The maximum load L3 is chosen to be sufficiently below the maximum design load of substrate 46 such that substrate 46 is protected from loads above its design limit. Sensor 100 therefore provides overload protection for the strain sensitive resistors.

It is noted that the design of sensor 100 allows the measurement of both loads that are pressing down on the seat and loads that are pulling up on the seat. It is the addition of spring 106 that allows for the measurement of upwardly directed loads while maintaining the unidirectional loading of sensor element 46. In other words, sensor 46 is always exposed to one of either compression or tension even when the seat loading is in either direction. This feature prevents hysteresis in the sensor and provides a more accurate sensor.

Variations of the Invention

Although the illustrated embodiment shows resistors 54A–D on the top surface 49, more or fewer resistors could be used. If desired, the resistors could be placed on bottom surface 50.

The weight sensor shown used a thick film resistor, one skilled in the art will realize that the preferred embodiment would work with other types of resistors. For example, discrete chip resistors could be attached to substrate 46 or thin film resistors could be used. Furthermore, the shape of substrate 46 could be varied to any configuration that would transfer the weight from the seat and concentrate it in the desired location on the substrate. For example a cross, round, or triangle shape could be used.

Another variation of the weight sensor would be to utilize other electrical connections. For example, other types of connectors or terminals could be used in place of wire harness 60.

Yet, a further variation would be to place signal conditioning circuitry on substrate 46 to amplify and filter the electrical signal before it is transmitted to the airbag controller.

The illustrated embodiment showed the use of the weight sensor between a seat pan and a seat member. It is contemplated to utilize the weight sensor in other locations. For example, the weight sensor could be mounted between the floor 38 and carriage 36.

While the invention has been taught with specific reference to these embodiments, someone skilled in the art will recognize that changes can be made in form and detail without departing from the spirit and the scope of the invention. The invention should therefore be limited only by the scope of the human imagination. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A weight sensor for sensing the weight of an occupant in a vehicle seat, the seat having a seat pan and a seat member, the weight sensor, comprising:
   a) a planar substrate having a hole therethrough;
   b) a case surrounding the substrate, the case having an upper boss, a lower boss and a pair of ends, the case adapted to be mounted between the seat pan and the seat member, the upper boss located adjacent the seat pan;
   c) at least one strain gauge resistor mounted on the substrate for generating an electrical signal in response to the substrate being stressed by the weight of the seat occupant, the electrical signal changing as a function of the weight of the occupant; and
   d) a fastener passing through the seat member, the case, the substrate and the seat pan, the fastener located adjacent the lower boss, the fastener securing the sensor between the seat pan and the seat member.

2. The weight sensor according to claim 1, wherein the case has a blade at each end, the blades extending from the case toward the seat member.

3. The weight sensor according to claim 2, wherein the blades cause the substrate to be stressed when weight is applied to the seat pan.

4. The weight sensor according to claim 2, wherein a gap is formed between the seat member and a center portion of the case.

5. The weight sensor according to claim 4, wherein when the seat occupant weight exceeds a first magnitude, the gap closes and the seat member is in contact with the center portion such that the substrate is protected from an excessive load.

6. The weight sensor according to claim 1, wherein the sensor is located in a seat weight path between the seat pan and the seat member.

7. The weight sensor according to claim 1, wherein a plurality of the seat weight sensors are mounted in the vehicle seat and support the weight of the vehicle occupant.

8. The weight sensor according to claim 1, wherein the fastener is selected from the group consisting of:
   a) bolts and nuts;
   b) screws and nuts; and
   c) rivets.

9. The weight sensor according to claim 8, wherein the fastener passes through a clearance aperture in the seat member.

10. The weight sensor according to claim 1, wherein at least one wire is connected to the resistor.

11. The weight sensor according to claim 1, wherein an elastomeric washer is located between the fastener and the seat member.

12. A weight sensor for sensing the weight of an occupant in a vehicle seat, the seat having a seat pan and a seat member, the weight sensor, comprising:
   a) a case mounted between the seat pan and the seat member;
   b) at least one strain gauge resistor mounted within the case for generating an electrical signal in response to the case being stressed by the weight of the seat occupant, the electrical signal changing as a function of the weight of the occupant;
   c) a fastener passing through the seat member, the case, and the seat pan, the fastener securing the sensor between the seat pan and the seat member; and
   d) the case adapted to transfer to the strain gage resistor the weight of the occupant up to a first magnitude, the case preventing the strain gage from receiving weight beyond that of the first magnitude.

13. The weight sensor according to claim 12, wherein the case further comprises:
   a) a first end, a second end and a central portion;
   b) an aperture passing through the central portion;
   c) an upper boss extending from the central portion;
   d) a lower boss extending from the central portion;
   e) a first blade extending from the first end;
   f) a second blade extending from the second end; and
   g) a substrate surrounded by the case, the strain gage resistor mounted on the substrate.

14. The weight sensor according to claim 13, wherein the blades extend as to contact the seat member.

15. The weight sensor according to claim 13, wherein the upper boss contacts the seat pan.

16. The weight sensor according to claim 13, wherein the lower boss contacts the fastener.

17. The weight sensor according to claim 13, wherein a gap is formed between the central portion and the seat member.

18. The weight sensor according to claim 17, wherein when weight beyond that of the first magnitude is applied, the central portion contacts the seat member thereby closing the gap.

19. The weight sensor according to claim 12, wherein a spring is located between the case and the seat pan.

20. The weight sensor according to claim 19, wherein a standoff extends toward the seat pan from each end of the case.

21. A weight sensor for sensing the weight of an occupant in a vehicle seat, the seat having a seat pan and a seat member, the seat member having an aperture, the weight sensor mounted between the seat pan and the seat member, the weight sensor comprising:
   a) a case having a first and second end;
   b) a lower boss extending from the case into the aperture;
   c) an upper boss in contact with the seat pan;
   d) a first blade located at the first end and a second blade located at the second end, the blades in contact with the seat member; and
   e) at least one strain gauge resistor mounted within the case for generating an electrical signal in response to the case being stressed by the weight of the seat occupant, the electrical signal changing as a function of the weight of the occupant.

22. The weight sensor according to claim 21, wherein a substrate is mounted in the case, the strain gage resistor mounted on the substrate.

23. The weight sensor according to claim 22, wherein a hole is located in the case and substrate.

24. The weight sensor according to claim 23, wherein a fastener passes through the aperture and the hole and the seat pan, the fastener securing the sensor between the seat pan and the seat member.

25. The weight sensor according to claim 21 wherein the case is formed from an elastomeric material.

26. The weight sensor according to claim 21 wherein a spring is located between the upper boss and the seat pan.

27. The weight sensor according to claim 26 wherein a first and second standoff extends toward the seat pan from the first and second ends.

28. A weight sensor for sensing the weight of an occupant in a vehicle seat, the seat having a first and second seat member comprising:
   a) a case mounted between the first and second members, the case adapted to move along an axis substantially perpendicular to the direction of occupant weight;
   b) at least one strain gauge resistor coupled to the case for generating an electrical signal in response to the case being stressed by the weight of the seat occupant, the strain gage resistor being sensitive to the weight of the seat occupant and insensitive to other loads.

29. The weight sensor according to claim 28, wherein the case decouples the strain gage resistor from weight that is applied along an axis substantially perpendicular to the direction of occupant weight.

30. The weight sensor according to claim 28, wherein the case further comprises:
   a) a first and second end;
   b) a lower boss and an upper boss;
   c) a first blade located at the first end and a second blade located at the second end;
   d) an aperture; and
   e) a substrate surrounded by the case, the strain gage resistor mounted on the substrate.

31. The weight sensor according to claim 30, wherein the first seat member has a hole, the lower boss located in the hole, the lower boss adapted to move in an axis in the hole.

32. The weight sensor according to claim 31, wherein a fastener secures the weight sensor between the first and second members.

33. The weight sensor according to claim 28 wherein a spring is located between the case and the second seat member.

34. The weight sensor according to claim 32 wherein a washer is located between the fastener and the first seat member.

35. The weight sensor according to claim 28 wherein the strain gage resistor is placed in tension.

36. The weight sensor according to claim 28 wherein the strain gage resistor is placed in compression.

37. A weight sensor for sensing the weight of an occupant in a vehicle seat, the seat having a first and second seat member, the weight sensor comprising:
   a) a case mounted adjacent the first seat member, the case having a first and second end;
   b) the case having a boss in contact with the first seat member;
   c) a first blade located at the first end and a second blade located at the second end, the blades extending through openings in the first seat member to be in contact with the second seat member; and
   d) at least one strain gauge resistor mounted to the case for generating an electrical signal in response to the case being stressed by the weight of the seat occupant, the electrical signal changing as a function of the weight of the occupant.

38. The weight sensor according to claim 37, wherein a fastener passes through the first and second seat members and the case.

39. The weight sensor according to claim 38, wherein a first spring is located between the case and a plate.

40. The weight sensor according to claim 26 wherein a second spring is located between the fastener and the second seat member.

41. The weight sensor according to claim 39, wherein the first spring is loaded to a first spring force.

42. The weight sensor according to claim 40, wherein the second spring is loaded to a second spring force.

43. The weight sensor according to claim 37 wherein the strain gage resistor is placed in either tension or compression but not both.

44. The weight sensor according to claim 37 wherein a reverse load is prevented from being applied to the weight sensor.

45. The weight sensor according to claim 37 wherein both a downwardly acting weight and an upwardly acting weight applied to the weight sensor causes an unidirectional stress in the strain gage resistors.

46. The weight sensor according to claim 37 wherein both a downwardly acting weight and an upwardly acting applied to the weight sensor cause a unidirectional stress in the strain gage resistor.

47. The weight sensor according to claim 45 wherein the weight sensor is adapted to prevent hysteresis in the output of the strain gage resistor.

* * * * *